US011956063B2

(12) United States Patent
King et al.

(10) Patent No.: US 11,956,063 B2
(45) Date of Patent: Apr. 9, 2024

(54) ENGINE CONTROL SYSTEM (71) Applicant: General Electric Company, Schenectady, NY (US)

(72) Inventors: Randall Benjamin King, West Chester, OH (US); Matthew Krupnick, West Chester, OH (US)

(73) Assignee: General Electric Company, Schenectady, NY (US)

( * ) Notice: Subject to any disclaimer, the term of this patent is extended or adjusted under 35 U.S.C. 154(b) by 415 days.

(21) Appl. No.: 17/098,955

(22) Filed: Nov. 16, 2020

(65) Prior Publication Data

US 2021/0152237 A1   May 20, 2021

Related U.S. Application Data

(60) Provisional application No. 62/935,433, filed on Nov. 14, 2019.

(51) Int. Cl.
*H04B 7/185*   (2006.01)
*H04W 88/06*   (2009.01)

(52) U.S. Cl.
CPC ........ *H04B 7/18506* (2013.01); *H04W 88/06* (2013.01)

(58) Field of Classification Search
CPC .......................... H04B 7/18506; H04W 88/06
See application file for complete search history.

(56) References Cited

U.S. PATENT DOCUMENTS

| | | | |
|---|---|---|---|
| 6,671,589 B2 | 12/2003 | Holst et al. | |
| 9,400,820 B2 | 7/2016 | Schowalter et al. | |
| 9,612,819 B2 | 4/2017 | Frayssignes et al. | |
| 9,817,654 B2 | 11/2017 | Angus | |
| 9,870,212 B2 | 1/2018 | Weckesser et al. | |
| 10,093,436 B2 * | 10/2018 | Bulumulla | G05B 23/00 |
| 10,235,153 B2 | 3/2019 | Boucher et al. | |
| 11,492,132 B2 * | 11/2022 | Scheid | H04L 9/50 |
| 2005/0026609 A1 | 2/2005 | Brinkley et al. | |
| 2006/0129289 A1 * | 6/2006 | Kumar | B61L 3/006 105/26.05 |
| 2010/0049418 A1 * | 2/2010 | Jehle | F02D 41/266 701/102 |
| 2013/0305238 A1 * | 11/2013 | Frayssignes | G06F 8/65 717/173 |
| 2017/0168810 A1 | 6/2017 | Knijnenburg et al. | |
| 2017/0308371 A1 | 10/2017 | Cantaloube | |

* cited by examiner

*Primary Examiner* — Tammara R Peyton
(74) *Attorney, Agent, or Firm* — HANLEY, FLIGHT & ZIMMERMAN, LLC (57) ABSTRACT

Certain examples disclose and describe apparatus and methods to reprogram all electronic engine control system processors through a single external network interface to an aircraft data loader. In such examples, a main processor that interfaces to an aircraft communication network is to operate as both a data loader and a loadable device. Distributed electronic engine control processors are reprogrammable from a single network interface, rather than requiring separate, direct access to each controller.

21 Claims, 7 Drawing Sheets

ENGINE CONTROL SYSTEM

CROSS-REFERENCE TO RELATED APPLICATION

This patent claims priority to U.S. Provisional Application Ser. No. 62/935,433, entitled "ENGINE CONTROL SYSTEM" which was filed on Nov. 14, 2019, and is hereby incorporated herein by reference in its entirety.

FIELD OF THE DISCLOSURE

This disclosure relates generally to engine control systems and, more particularly, to engine control systems for centralized data loading and processing and associated methods of use.

BACKGROUND

In recent years, engines have been increasingly utilized in a variety of applications and fields such as aerial vehicles, power, etc. Engines are intricate machines with extensive availability, reliability, and serviceability requirements. Engines, such as engines in an aircraft, can be controlled by one or more electronic engine controllers. Access to, configuration of, and communication between such controllers can impact engine performance, aircraft operation, reliability, and safety.

BRIEF SUMMARY

Methods, apparatus, systems, and articles of manufacture for connecting a primary engine control processor to a distributed engine control processor via a wired connection to allow the primary processor to be programmed and to program the distributed processor are disclosed.

Certain examples provide an electronic engine control system including: a first processor programmable by an aircraft data loader according to a file; a second processor programmable by the first processor according to the file; and a wired connection between the first processor and the second processor, the wire connection to transfer the file between the first processor and the second processor.

Certain examples provide a non-transitory computer readable medium comprising machine-readable instructions that, when executed, cause at least a first processor to at least: receive, from an aircraft data loader, files for installation on the first processor; trigger a reboot of a second processor; and, while installing the files on the first processor, transfer the files to the second processor via a wired connection to facilitate installation of the files on the second processor.

Certain examples provide a method for programming an engine control system, the method comprising: receiving, from an aircraft data loader, files for installation on a first processor; triggering a reboot of a second processor; and, while installing the files on the first processor, transferring the files to the second processor via a wired connection to facilitate installation of the files on the second processor.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe example implementations and not to be taken limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object.

As used herein, the terms "system," "unit," "module," "engine," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, engine, or system may include a hard-wired device that performs operations based on hard-wired logic of the device. Various modules, units, engines, and/or systems shown in the attached figures may represent the hardware that operates based on software or hardwired instructions, the software that directs hardware to perform the operations, or a combination thereof.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects, and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities, and/or steps, the phrase "at least one of A or B" is intended to refer to implementations including any of (1) at least one A, (2) at least one B, and (3) at least one A and at least one B.

In addition, it should be understood that references to "one embodiment" or "an embodiment" of the present disclosure are not intended to be interpreted as excluding the existence of additional embodiments that also incorporate the recited features.

A turbine engine, also called a combustion turbine or a gas turbine, is a type of internal combustion engine. Turbine engines are commonly utilized in aircraft and power-generation applications. As used herein, the terms "asset," "aircraft turbine engine," "gas turbine," "land-based turbine engine," and "turbine engine" are used interchangeably. A basic operation of the turbine engine includes an intake of fresh atmospheric air flow through the front of the turbine engine with a fan. In some examples, the air flow travels through an intermediate-pressure compressor or a booster compressor located between the fan and a high-pressure compressor. The booster compressor is used to supercharge or boost the pressure of the air flow prior to the air flow entering the high-pressure compressor. The air flow can then travel through the high-pressure compressor that further pressurizes the air flow. The high-pressure compressor includes a group of blades attached to a shaft. The blades spin at high speed and subsequently compress the air flow. The high-pressure compressor then feeds the pressurized air flow to a combustion chamber. In some examples, the high-pressure compressor feeds the pressurized air flow at speeds of hundreds of miles per hour. In some instances, the combustion chamber includes one or more rings of fuel injectors that inject a steady stream of fuel into the combustion chamber, where the fuel mixes with the pressurized air flow.

In the combustion chamber of the turbine engine, the fuel is ignited with an electric spark provided by an igniter, where the fuel in some examples burns at temperatures of more than 2000 degrees Fahrenheit. The resulting combustion produces a high-temperature, high-pressure gas stream (e.g., hot combustion gas) that passes through another group of blades called a turbine. A turbine includes an intricate array of alternating rotating and stationary airfoil-section blades. As the hot combustion gas passes through the turbine, the hot combustion gas expands, causing the rotating blades to spin. The rotating blades serve at least two purposes. A first purpose of the rotating blades is to drive the booster compressor and/or the high-pressure compressor to draw more pressured air into the combustion chamber. For example, the turbine is attached to the same shaft as the high-pressure compressor in a direct-drive configuration, thus, the spinning of the turbine causes the high-pressure compressor to spin. A second purpose of the rotating blades is to spin a generator operatively coupled to the turbine section to produce electricity. For example, the turbine can generate electricity to be used by an aircraft, a power station, etc.

In the example of an aircraft turbine engine, after passing through the turbine, the hot combustion gas exits the aircraft turbine engine through a nozzle at the back of the aircraft turbine engine. As the hot combustion gas exits the nozzle, the aircraft turbine engine and the corresponding aircraft coupled to the aircraft turbine engine are accelerated forward (e.g., thrusted forward). In the example of a land-based turbine engine, after passing through the turbine, the hot combustion gas is dissipated, used to generate steam, etc.

Certain examples provide an engine control, referred to as a full authority digital engine (or electronics) control (FADEC). The FADEC includes a digital computer, referred to as an "electronic engine controller" (EEC) or "engine control unit" (ECU), and related accessories that control aspects of aircraft engine performance. The FADEC can be used with a variety of engines such as piston engines, jet engines, other aircraft engines, etc. In certain examples, the EEC/ECU is provided separate from the FADEC, allowing manual override or intervention by a pilot and/or other operator.

The engine control unit receives values for a plurality of input variables relating to flight condition (e.g., air density, throttle lever position, engine temperatures, engine pressures, etc.). The engine control unit computes engine operating parameters such as fuel flow, stator vane position, air bleed valve position, etc., using the flight condition data. The engine operating parameters can be used by the engine control unit, with or without the rest of the FADEC, to control engine starting and restarting and to calibrate engine efficiency for a given flight condition. In certain examples, the control unit can limit engine behavior/operation to avoid exceed an engine temperature threshold and/or other engine operating constraint, for example.

Figure 1:
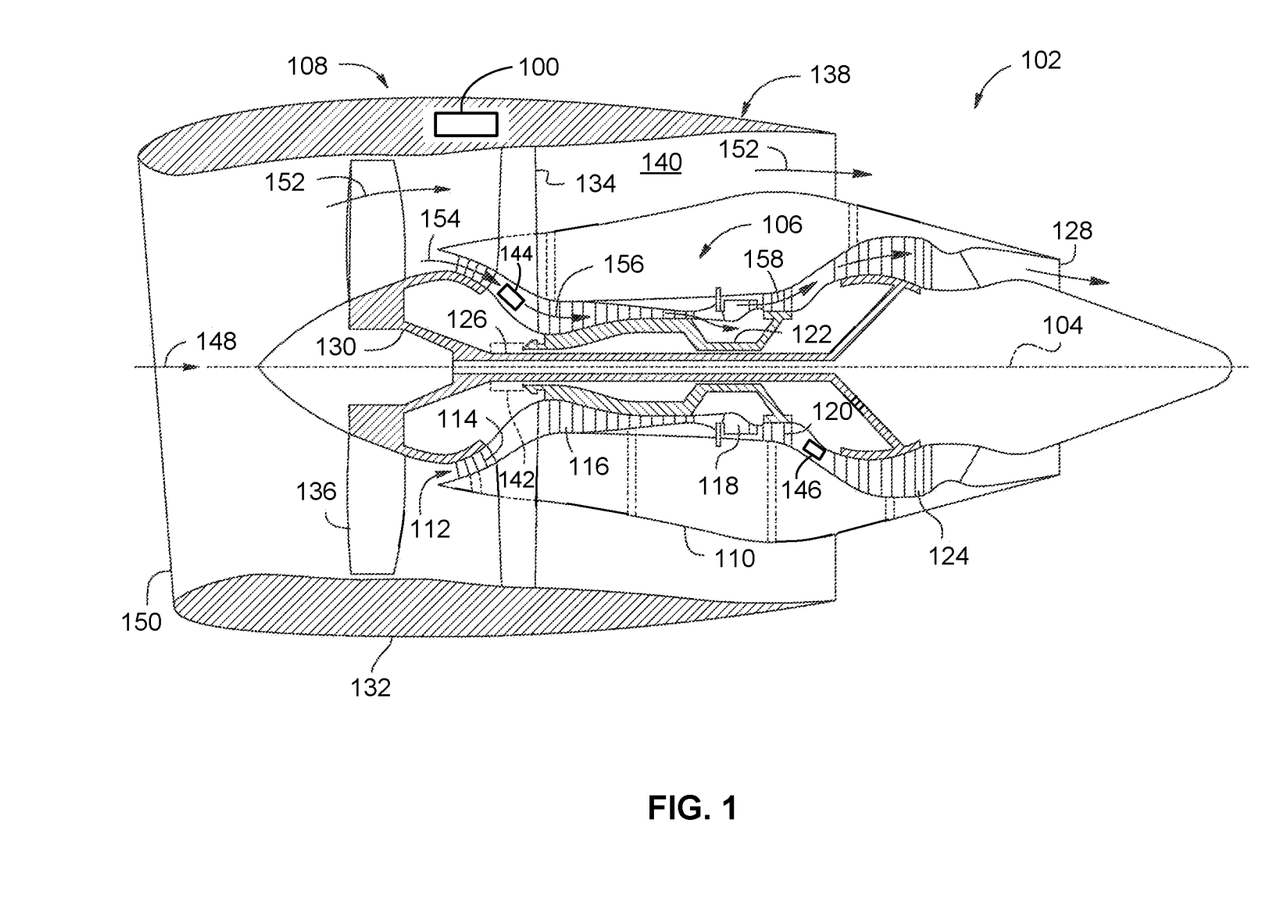
FIG. 1 illustrates an example engine that can be utilized within an aircraft in which the examples disclosed herein can be implemented.

FIG. 1 is a schematic illustration of an example turbine engine controller 100 monitoring an example gas turbine engine 102. In the illustrated example, the turbine engine controller 100 is a full-authority digital engine control (FADEC) unit, but the controller 100 can also be an engine control unit without the additional components of a FADEC (e.g., to allow operator override rather than fully automated operation, etc.). For example, the turbine engine controller 100 can include a closed loop control module to generate a control input (e.g., a thrust command, a de-rate parameter, etc.) to the engine 102 based on an engine input (e.g., a pilot command, an aircraft control system command, etc.). Alternatively, the turbine engine controller 100 may be any other type of data acquisition and/or control computing device. FIG. 1 illustrates a cross-sectional view of the engine 102 that can be utilized within an aircraft in accordance with aspects of the disclosed examples. The gas turbine engine 102 is shown having a longitudinal or axial centerline axis 104 extending throughout the gas turbine engine 102 for reference purposes. In general, the engine 102 can include a core gas turbine engine 106 and a fan section 108 positioned upstream thereof. The core gas turbine engine 106 can generally include a substantially tubular outer casing 110 that defines an annular inlet 112. In addition, the outer casing 110 can further enclose and support a booster compressor 114 for increasing the pressure of the air that enters the core gas turbine engine 106 to a first pressure level. A high-pressure, multi-stage, axial-flow compressor 116 can then receive the pressurized air from the booster compressor 114 and further increase the pressure of such air to a second pressure level. Alternatively, the high-pressure, multi-stage compressor 116 can be a high-pressure, multi-stage centrifugal compressor or a high-pressure, multi-stage axial-centrifugal compressor.

In the illustrated example of FIG. 1, the pressurized air exiting the high-pressure compressor 116 can then flow to a combustor 118 within which fuel is injected into the flow of pressurized air, with the resulting mixture being combusted within the combustor 118. The high-energy combustion products are directed from the combustor 118 along the hot gas path of the engine 102 to a first (high-pressure) turbine 120 for driving the high-pressure compressor 116 via a first (high-pressure) drive shaft 122, and then to a second (low-pressure) turbine 124 for driving the booster compressor 114 and fan section 108 via a second (low-pressure) drive shaft 126 that is generally coaxial with first drive shaft 122. After driving each of the turbines 120 and 124, the combustion products can be expelled from the core gas turbine engine 106 via an exhaust nozzle 128 to provide propulsive jet thrust.

In some examples, each of the compressors 114, 116 can include a plurality of compressor stages, with each stage including both an annular array of stationary compressor vanes and an annular array of rotating compressor blades positioned immediately downstream of the compressor vanes. Similarly, each of the turbines 120, 124 can include a plurality of turbine stages, with each stage including both an annular array of stationary nozzle vanes and an annular array of rotating turbine blades positioned immediately downstream of the nozzle vanes.

Additionally, as shown in FIG. 1, the fan section 108 of the engine 102 can generally include a rotatable, axial-flow fan rotor assembly 130 that is configured to be surrounded by an annular fan casing 132. The fan casing 132 can be configured to be supported relative to the core gas turbine engine 106 by a plurality of substantially radially-extending, circumferentially-spaced outlet guide vanes 134. As such, the fan casing 132 can enclose the fan rotor assembly 130 and its corresponding fan rotor blades 136. Moreover, a downstream section 138 of the fan casing 132 can extend over an outer portion of the core gas turbine engine 106 to define a secondary, or by-pass, airflow conduit 140 that provides additional propulsive jet thrust.

In some examples, the second (low-pressure) drive shaft 126 is directly coupled to the fan rotor assembly 130 to provide a direct-drive configuration. Alternatively, the second drive shaft 126 can be coupled to the fan rotor assembly 130 via a speed reduction device 142 (e.g., a reduction gear or gearbox) to provide an indirect-drive or geared drive configuration. Such a speed reduction device(s) can also be provided between any other suitable shafts and/or spools within the engine 102 as desired or required.

In the illustrated example of FIG. 1, the engine 102 includes sensors 144, 146 communicatively coupled to the turbine engine controller 100. Alternatively, the sensors 144, 146 can be communicatively coupled to a control system of an aircraft coupled to the engine 102, in which the control system is communicatively coupled to the example turbine engine controller 100. In the illustrated example, the sensors 144, 146 are gas-path temperature sensors (e.g., exhaust gas-path temperature sensors, etc.). For example, the sensors 144, 146 can be monitoring a compressor inlet temperature and a temperature of gas exiting the high-pressure turbine 120. Alternatively, the sensors 144, 146 can be chip detector sensors (e.g., magnetic chip detector sensors, etc.), dust sensors, flow sensors, gas-path pressure sensors, rotor speed sensors, vibration sensors, position sensors (e.g., actuator position sensors, sensors detailing variable geometry, etc.), etc. Although the sensors 144, 146 are depicted in FIG. 1 as being at specific locations, the sensors 144, 146 can be located elsewhere on the engine 102. Additionally or alternatively, there can be more than two sensors 144, 146 located on the engine 102. A typical implementation has six gas-path temperature sensors 144, 146. Additionally or alternatively, there can be more than one example turbine engine controller 100 coupled to the engine 102. Although the example turbine engine controller 100 is depicted in FIG. 1 as being proximate the fan section 108, the turbine engine controller 100 can be located elsewhere on the engine 102 or elsewhere on the aircraft coupled to the engine 102.

During operation of the engine 102, an initial air flow (indicated by arrow 148) can enter the engine 102 through an associated inlet 150 of the fan casing 132. The air flow 148 then passes through the fan blades 136 and splits into a first compressed air flow (indicated by arrow 152) that moves through conduit 140 and a second compressed air flow (indicated by arrow 154) which enters the booster compressor 114. The pressure of the second compressed air flow 154 is then increased and enters the high-pressure compressor 116 (as indicated by arrow 156). After mixing with fuel and being combusted within the combustor 118, the combustion products 158 exit the combustor 118 and flow through the first turbine 120. Thereafter, the combustion products 158 flow through the second turbine 124 and exit the exhaust nozzle 128 to provide thrust for the engine 102.

The one or more example engine control unit(s) 100 associated with the engine 102 can record operational and performance data for the engine 102. The ECU 100 can be in communication with one or more other processors, sensors, etc., mounted on the engine 102 and/or positioned elsewhere in the aircraft (e.g., on wing, in cockpit, in main cabin, in engine compartment, in cargo, etc.). The communication can be one-way communication and/or two-way communication, for example.

As such, the engine control unit 100 can monitor and control operations of the engine 102. While depicted in the example of FIG. 1 as an engine on a wing of an aircraft, the engine 102 can be an engine of another vehicle, an engine of a stationary power-generating system, another type of turbine, etc.

Computing systems on an aircraft can have field loadable software loaded through a central data loader on an aircraft. This central data loader interfaces to field loadable systems through the aircraft communication network. Electronic engine control systems, such as the engine control unit 100, can include distributed processing units with separately loadable software parts and only one processing unit interfacing to an external aircraft communication network.

Certain examples provide apparatus and methods to reprogram all electronic engine control system processors through a single external network interface to an aircraft data loader. In such examples, a processor that interfaces to an aircraft communication network is to operate simultaneously as both a data loader (e.g., an ARINC 615A data loader and/or other aircraft system data loader, etc.) and a loadable device (e.g., an ARINC 615A loadable device and/o other aircraft system loadable device, etc.). As such, the electronic engine control system operates as both data loader and loadable device. Distributed electronic engine control processors are reprogrammable from a single network interface, rather than requiring separate, direct access to each controller (e.g., in cabin, on wing, etc.). A load type can be used to determine which processor to load (e.g., using an ARINC 665-3 LUH Load Type ID field, etc.).

In prior systems, the electronic engine control system processing units are not directly connected to the aircraft communication network and must be reprogrammed by opening the cowl of the engine and connecting a portable maintenance device to the processing unit. This method is time consuming and adds additional burden on maintenance operators to follow more than one procedure for loading aircraft software.

On other aircraft systems, internal system switches are used to route data load requests and data load network traffic to specific processing units not directly connected to the external aircraft network. This method requires the aircraft data loader to wait until the distributed unit is ready to process network messages directly.

Certain examples remedy these deficiencies and address these problems by adjusting the primary electronic engine control processor that interfaces to the aircraft communication network to operate simultaneously as both a data loader and a loadable device. As an ARINC 615A loadable device, for example, the engine control processor receives load requests from an aircraft data loader, collects load image files from the aircraft data loader, and sends status messages to the aircraft data loader using a load protocol (e.g., the ARINC 615A load protocol, etc.). The main engine control processor can be loaded itself from the aircraft data loader. As an ARINC 615A data loader, for example, the main engine control processor sends load requests to other distributed electronic engine control processor(s), provides load image files to the distributed processing unit(s), and receives status messages from the distributed units using the load protocol (e.g., the ARINC 615A load protocol, etc.). The main engine control processor interfaces to the distributed processors through Ethernet and/or other wired connections internal to the electronic engine control system. The processor to be loaded is determined by examining the Target Hardware ID and Load Type ID fields of the ARINC 665-3 header file for a loadable software part, for example.

Collecting all load images from the aircraft data loader while waiting for a distributed processor to reboot into load mode (which can take several minutes) reduces an overall load time, for example. Reprogramming from the aircraft data loader eliminates the need to open an engine cowl and to follow two different procedures for loading electronic engine control software on the distributed processor.

Using such a connected primary or main electronic engine control system provides a capability for central aircraft reprogramming of electronic engine control systems that do not directly interface to the aircraft communication network. Such a capability did not exist in prior systems. Further, certain examples provide an additional improvement and advantage by reducing the time to reprogram because the load files can be gathered by the processor interfacing to the aircraft network while the distributed systems reboot into load mode. Reprogramming from an aircraft central data loader removes the need to have portable maintenance devices available. Additionally, the time to perform all reprogramming operations is reduced because the engine cowl does not need to be opened to access processing systems not connected to the aircraft network. Further, distributed unit software is aircraft loadable.

Figure 2:
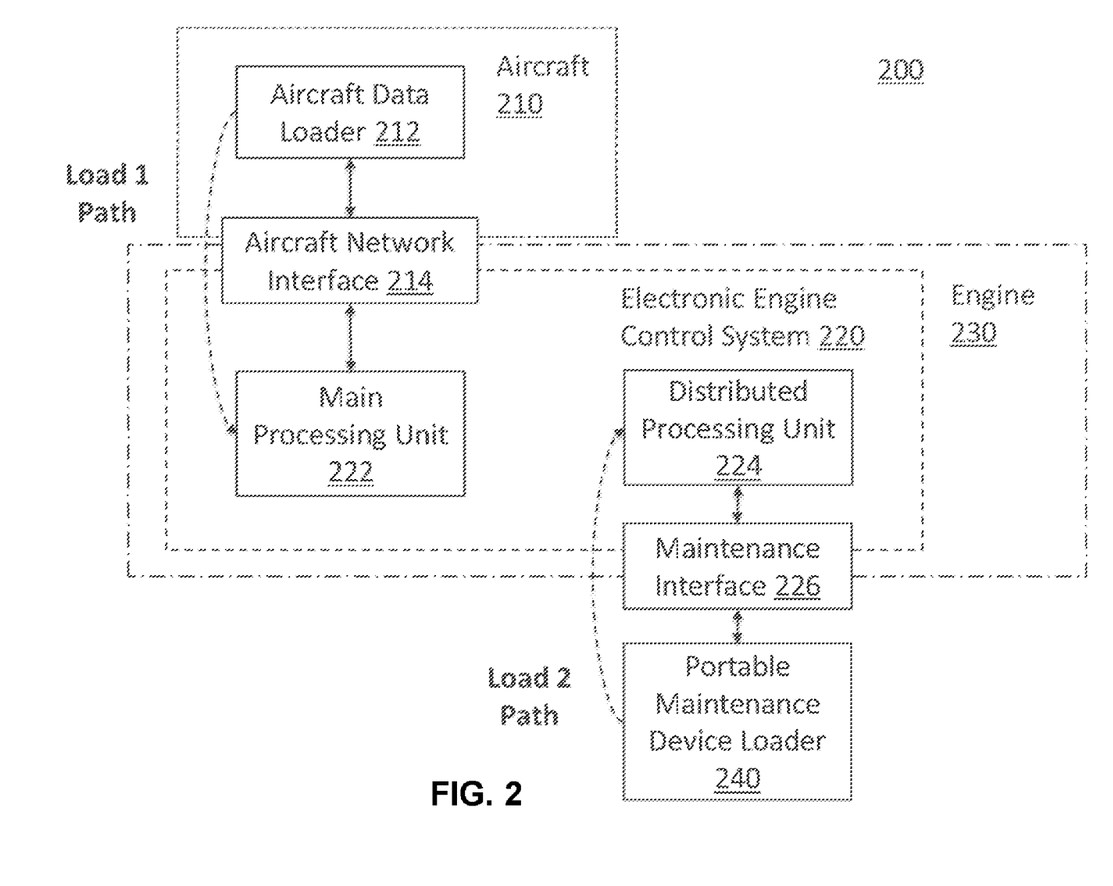
FIG. 2 is a schematic of an example engine control system.

FIG. 2 is a schematic illustration of an example prior engine control system 200 in which an aircraft data loader 212 in an aircraft 210 uses an aircraft network interface 214 to communicate with a main processing unit 222 of an electronic engine control system 220 of an engine 230. The electronic engine control system 220 also includes a distributed processing unit 224 accessible in the engine 230 via a maintenance interface 226 to enable a portable maintenance device loader 240 to separately configure the distributed processing unit 224 apart from the main processing unit 222. As such, the main processing unit 222 is configured by the aircraft data loader 212 via the aircraft network interface 214 along load path 1. The distributed processing unit 224 is separately and independently configured by the portable maintenance device loader 240 via the maintenance interface 226 along load path 2. As shown in the example of FIG. 2, load path 1 is completely separate from load path 2, and the hardware 212, 214, 222 involved in load path 1 is distinct from and does not interact with the hardware 224, 226, 240 involved in load path 2.

Figure 3:
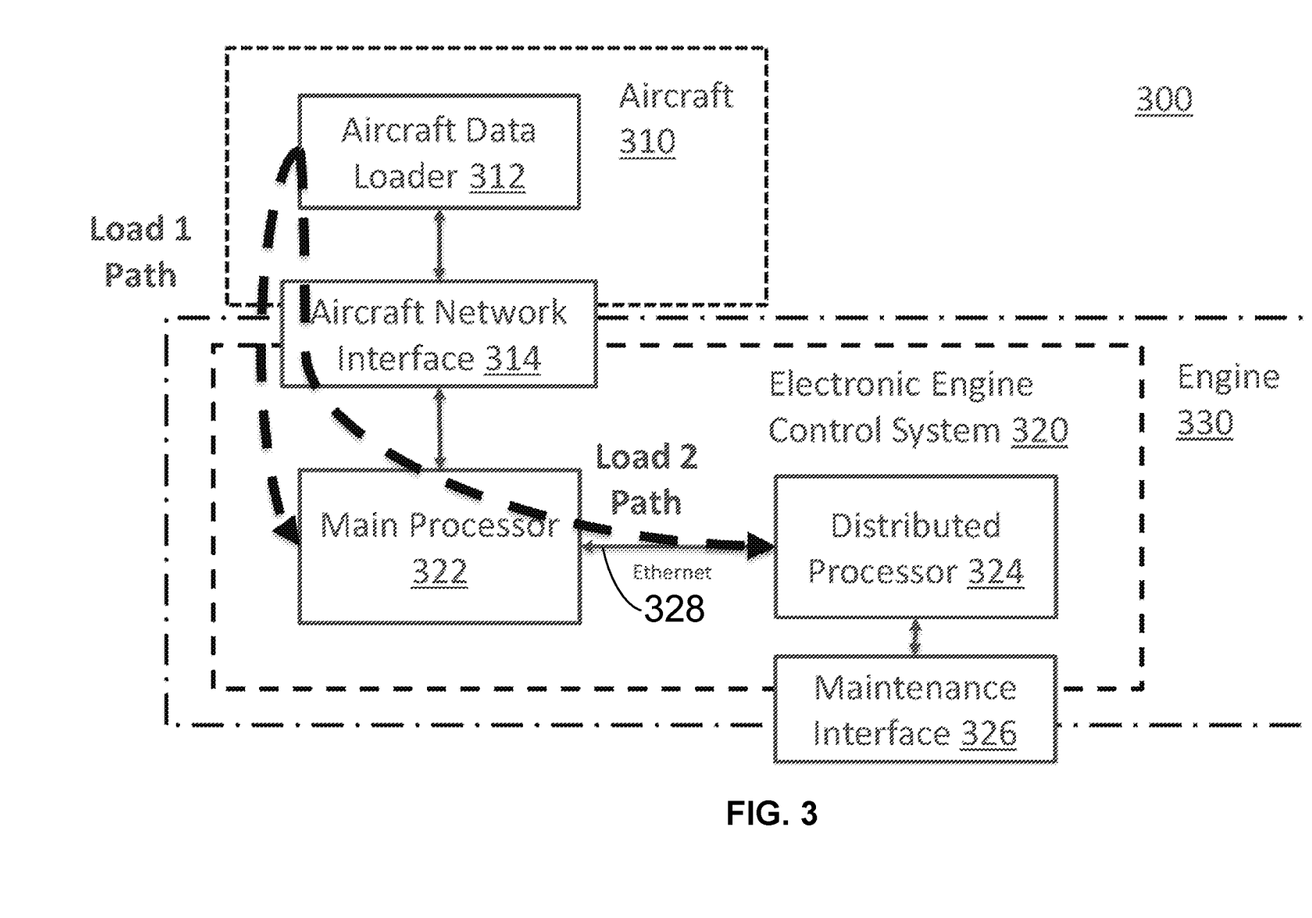
FIG. 3 is a schematic of an example engine control system.

FIG. 3 is a schematic illustration of an example improved engine control system 300 in which an aircraft data loader 312 in an aircraft 310 uses an aircraft network interface 314 to communicate with a main processor 322 of an electronic engine control system 320 of an engine 330. The electronic engine control system 320 also includes a distributed processor 324 accessible in the engine 330 via a maintenance interface 326 but also connected via a wired connection 328 (e.g., Ethernet, coaxial cable, other fiber or metal wire, etc.) to enable the main processor 322 to configure the distributed processor 324. As such, the main processor 322 is configured by the aircraft data loader 312 via the aircraft network interface 314 along load path 1. The distributed processor 324 is also configured by the aircraft data loader 312 via the aircraft network interface 314, the main processor 322, and the wired connection 328 along load path 2. Thus, physical access to the distributed processor 324 and separate configuration via a portable maintenance device loader can be avoided.

As shown in the example of FIG. 3, load path 1 and load path 2 are both driven by the aircraft data loader 312. The aircraft data loader 312 drives an update and/or other configuration of the main processor 322 via the aircraft network interface 314. The aircraft data loader 312 also drives an update and/or other configuration of the distributed processor 324 via the aircraft network interface 314, the main processor 322, and the wired connection 328. Communication with and configuration of the main processor 322 and the distributed processor 324 can occur in parallel (overlapping or partially in parallel, substantially in parallel, etc.) and/or in sequence as driven by the aircraft data loader 312 and the main processor 322, for example.

As shown in FIGS. 2-3, the separated system of FIG. 2 does not allow the distributed processing unit 224 to be programmed during flight, since the processor 224 must be physically accessed via the maintenance interface 226 by the portable maintenance device loader 240 via the external of the engine 230. In the example of FIG. 3, however, the aircraft data loader 312 can drive programming to both the main processor 322 and the distributed processor 324 before flight, during flight, after flight, at another time, etc.

Figure 4:
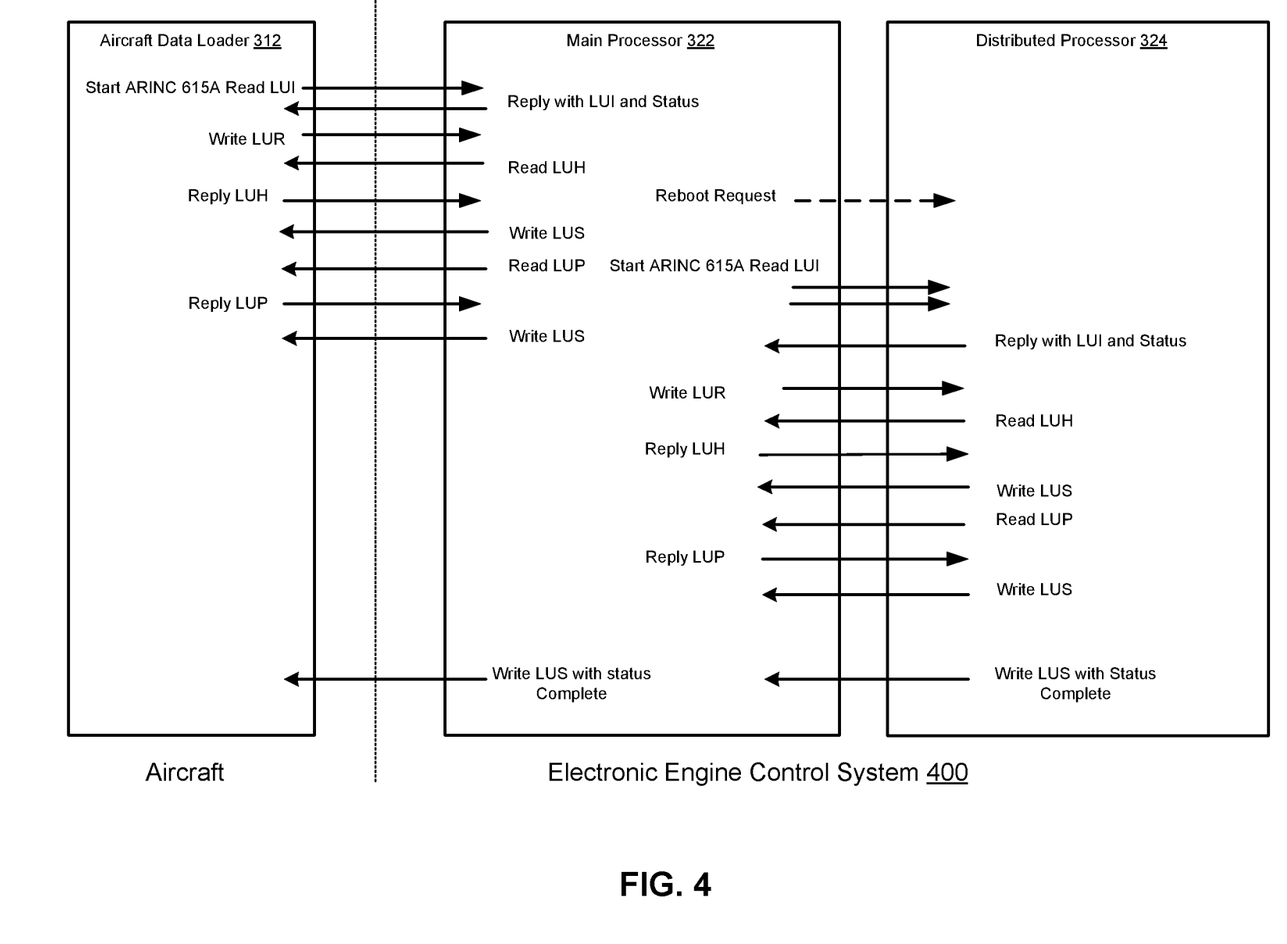
FIG. 4 is a block diagram of an implementation of an example electronic engine control system and associated communication.

FIG. 4 illustrates a schematic view of an example electronic engine control system 400 including a flow of communications between the aircraft data loader 312, the main processor 322, and the distributed or secondary processor 324 to provide one or more data files and/or other information from the aircraft data loader 312 to the distributed processor 324 via the main processor 322 without external device loader access. As shown in the example of FIG. 4, the aircraft data loader 312 initiates a read operation for a data file (e.g., a read or load upload initialization (LUI) command) with the main processor 322. The data file can be associated with a request, such as a load upload request (LUR), etc. The main processor 322 replies to the aircraft data loader 312 with status information (e.g., a load upload status (LUS) message) and the data file. The aircraft data loader 312 initiates a write to the main processor 322 based on the status. In response, the main processor 322 reads data from the aircraft data loader 312, which the aircraft data loader 312 sends (e.g., in a data or application program file, etc.) in reply to the main processor 322. The main processor 322 triggers, via the wired connection 328, a reboot of the distributed processor 324, and writes a response or update to the aircraft data loader 312. The main processor 322 reads/requests data (e.g., another program or data file, etc.) from the aircraft data loader 312, which replies with the data to the main processor 312. The main processor 322 initiates a read and status request of the distributed processor 324. The main processor 322 writes data to the aircraft data loader 312 and also receives data and a status update from the distributed processor 324.

The main processor 322 then writes data to the distributed processor 324. The distributed processor 324 reads/requests data (e.g., a data file, application program file, etc.) from the main processor 322, which replies with data to the distributed processor 324. The distributed processor 324 writes information to the main processor 322 and then reads/requests information from the main processor 322. The main processor 322 replies with data to the distributed processor 324. The distributed processor 324 writes data to the main processor 322. Then, the distributed processor 324 writes information to the main processor 322 and updates its status to complete. The main processor 322 passes the information with a status of complete on to the aircraft data loader 312.

Thus, the same and/or different data/application can be provided from the aircraft data loader 312 to the main processor 322 and/or the distributed/second processor 324 via the main processor 322 and the wired connection 328. Reprogramming the distributed processor 324 can be completed without physical access to the distributed processor 324 on the wing in the exterior of the aircraft. In certain examples, the aircraft data loader 312 communicates with the main processor 322 to program the main processor 322 in a first mode, and the main processor 322 transitions to a second mode to program the distributed processor 324 based on instructions from the aircraft data loader 312.

While example implementations are illustrated in conjunction with FIGS. 1-4, elements, processes and/or devices illustrated in conjunction with FIGS. 1-4 can be combined, divided, re-arranged, omitted, eliminated and/or implemented in any other way. Further, components disclosed and described herein can be implemented by hardware, machine readable instructions, software, firmware and/or any combination of hardware, machine readable instructions, software and/or firmware. Thus, for example, components disclosed and described herein can be implemented by analog and/or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the components is/are hereby expressly defined to include a tangible computer readable storage device or storage disk such as a memory, a digital versatile disk (DVD), a compact disk (CD), a Blu-ray disk, etc. storing the software (including computer- and/or other machine-readable instructions) and/or firmware.

Figure 5:
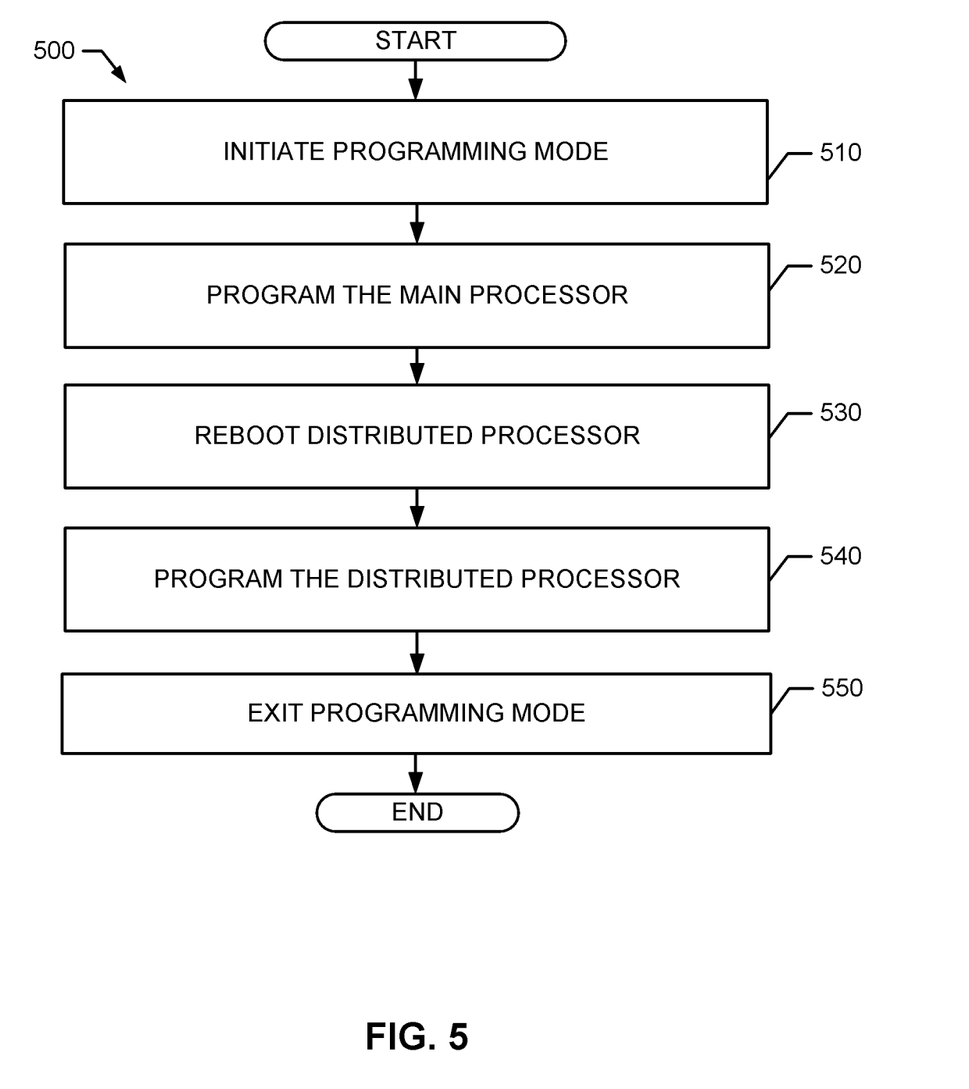
FIGS. 5-6 illustrate flow diagrams of example processes to program the example engine control system of FIGS. 3-4.
Figure 6:
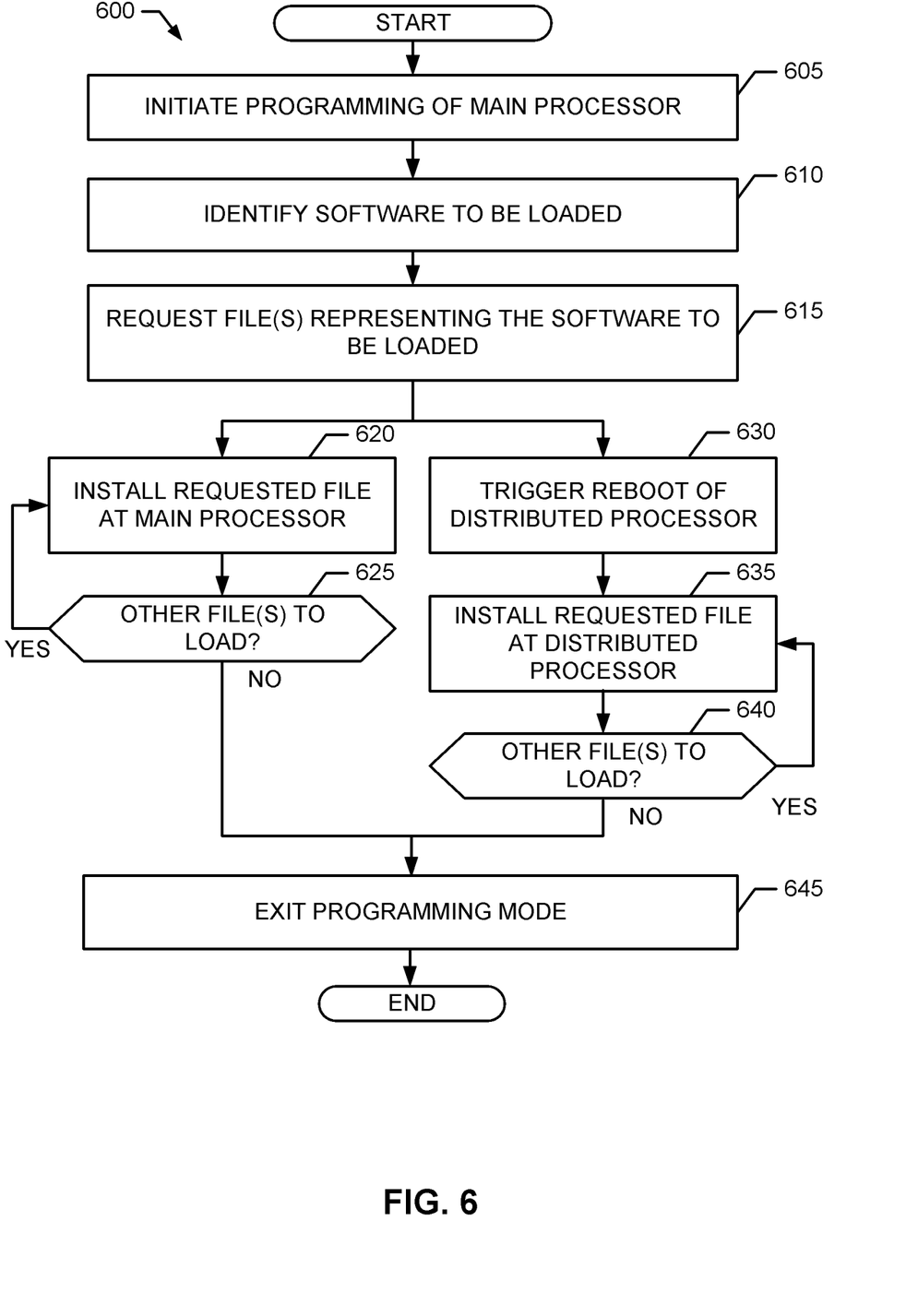

Flowcharts representative of example hardware logic, machine readable instructions, hardware implemented state machines, and/or any combination thereof for programming the main processor 322 and the distributed processor 324 are shown in FIGS. 5-6. The machine readable instructions may be one or more executable programs or portion(s) of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIGS. 5-6, many other methods of programming the main processor 322 and the distributed processor 324 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example process(es) disclosed and described herein may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process(es) can be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. In addition, the term "including" is open-ended in the same manner as the term "comprising" is open-ended.

FIG. 5 illustrates a flow diagram of an example process 500 to program the primary or main processor 322 and the secondary or distributed processor 324 via the aircraft data loader 312. At block 510, the aircraft data loader 312 initiates a programming mode of the main processor 322. For example, the aircraft data loader 312 triggers the main processor 322 to enter a programming mode (e.g., from an operation or execution mode, etc.) and/or otherwise be receptive to new instructions/new operating program, etc.

At block 520, the aircraft data loader 312 programs the main processor 322 according to a status. For example, the aircraft data loader 312 provides instructions, data, parameters, etc., to the main processor 322 for flight/engine management, engine configuration, operational flight program, fuel usage, etc., based on a status or state associated with the aircraft 310, engine 330, flight plan, flight conditions, etc. For example, the state/status can include engaged, idle, accelerate, decelerate, takeoff, landing, cruising, normal, critical, error, etc.

At block 530, the main processor 322 reboots the distributed processor 324 to put the distributed processor 324 in a programming mode. For example, the main processor 322 sends one or more instructions to the distributed processor 324 via the link 328 to trigger a reboot/restart of the distributed processor 324 and/or otherwise enter into a programming mode. At block 540, the main processor 322 programs the distributed processor 324 based on information from the aircraft data loader 312. For example, the main processor 322 provides instructions, data, parameters, etc., to the distributed processor 324 for flight/engine management, engine configuration, operational flight program, fuel usage, etc., such that the distributed processor 324 is programmed the same as the main processor 322 and/or according to different instructions/data than that used to program the main processor 322, etc. At block 550, the main processor 322 (and the distributed processor 324) exits the programming mode (e.g., into an operation or execution mode, etc.), for example.

FIG. 6 illustrates a flow diagram of an example process 600 to program the primary or main processor 322 and the secondary or distributed processor 324 via the aircraft data loader 312. At block 605, in response to a trigger or request to load software to the main processor 322, programming of the main processor 322 is initiated. For example, when a request has been made to load software, the aircraft data loader 312 sends a read LUI file request to the main processor 322 to be loaded. The main processor 322 receives this request and replies to the loader 312 with the LUI file and a status LUS message. In certain examples, the initiation can include the main processor 322 entering a programming or configuration mode (e.g., based on the LUI file, etc.).

At block 610, an identification of software to be loaded onto the main processor 322 is requested. For example, the data loader 312 sends a request load file (e.g., an LUR file) with a list of software to be loaded to the main processor 322. The main processor 322 reads the request load file and requests a list of data files forming the software to be loaded. For example, the main processor 322 reads the LUR file and then requests to read a LUH file associated with the software to load. The LUH file includes a list of data files (LUP files) that make up the software to load. The loader 312 replies by transmitting the LUH file to the main processor 322.

At block 615, the main processor 322 requests file(s) representing the software to be loaded onto the main processor 322. For example, the main processor 322 reads the list of data files (e.g., the LUH file) and requests data files from the aircraft data loader 312 (e.g., sends read requests to the data loader for the LUP files until all LUP files have been transferred). The data loader 312 replies with the data files.

At block 620, the requested file is installed at the main processor 322. For example, the requested data file is installed, loaded, and/or otherwise used to configure the main processor 322. At block 625, if other file(s) remain to be loaded, then the main processor 322 requests the file(s) from the aircraft data loader at block 615. The process loops until the file(s) have been installed and/or otherwise used by the main processor 322. In certain examples, the main processor 322 sends status messages (e.g., LUS status messages) to the aircraft data loader 312 indicating load progress and, when finished, completion of the software installation.

At block 630, the main processor 322 triggers a reboot/restart of the distributed processor 324 via a command or instruction sent over the wired connection or link 328. The distributed processor 324 is then ready (e.g., in a programming or configuration mode, etc.) to receive file(s) for software to program the distributed processor 324.

At block 635, file(s) are installed at the distributed processor 324. For example, an identification of software to be loaded onto the distributed processor 324 is requested. For example, the main processor 322 sends a request load file (e.g., an LUR file) with a list of software to be loaded to the distributed processor 324 via the wired connection 328. The distributed processor 324 reads the request load file and requests a list of data files forming the software to be loaded. For example, the distributed processor 324 reads the LUR file and then requests to read a LUH file associated with the software to load. The LUH file includes a list of data files (LUP files) that make up the software to load. The main processor 322 replies by transmitting the LUH file to the distributed processor 324. Based on the LUH file, the requested file is provided by the main processor 322 and installed at the distributed processor 324. For example, the requested data file is installed, loaded, and/or otherwise used to configure the distributed processor 324. At block 640, if other file(s) remain to be loaded, then the distributed processor 324 requests the file(s) from the main processor 322 at block 635. The process loops until the file(s) have been installed and/or otherwise used by the distributed processor 324. In certain examples, the distributed processor 324 sends status messages (e.g., LUS status messages) to the main processor via the link 328 indicating load progress and, when finished, completion of the software installation.

Thus, programming of the main processor 322 and the distributed processor 324 proceed largely in parallel. The aircraft data loader 312 provides files to the main processor 322 which installs/executes the files and propagates the files for installation/execution by the distributed processor 324. Communication between the main processor 322 and the distributed processor 324 occurs via the wired connection 328. At block 645, when installation of files is complete, the processors 322-324 exit the programming or load mode and/or otherwise switch to an operating/execution mode according to the installed software.

Thus, the aircraft data loader 312 gathers and transfers files (e.g., via ARINC 615A protocol, etc.) to the main processor 322, and the main processor 322 gathers and transfers files (e.g., via ARINC 615A protocol, etc.) to the distributed processor 324. By gathering the files first from the aircraft data loader 312 and storing the files in high speed accessible memory (e.g., Random Access Memory (RAM), etc.), the main processor 322 can transfer the files to the distributed processor 324 on a much higher speed bus than the aircraft data bus. The main processor 322 can gather the files/data while waiting for the distributed processor 324 to be ready to accept the data/files (which can take time in implemented systems). By gathering data/files while waiting for the distributed processor 324 to reboot, for example, the overall load time is reduced compared to a setup in which the main processor 322 serves only as a switch passing traffic back and forth between the aircraft data loader 312 and the distributed processor 324.

Figure 7:
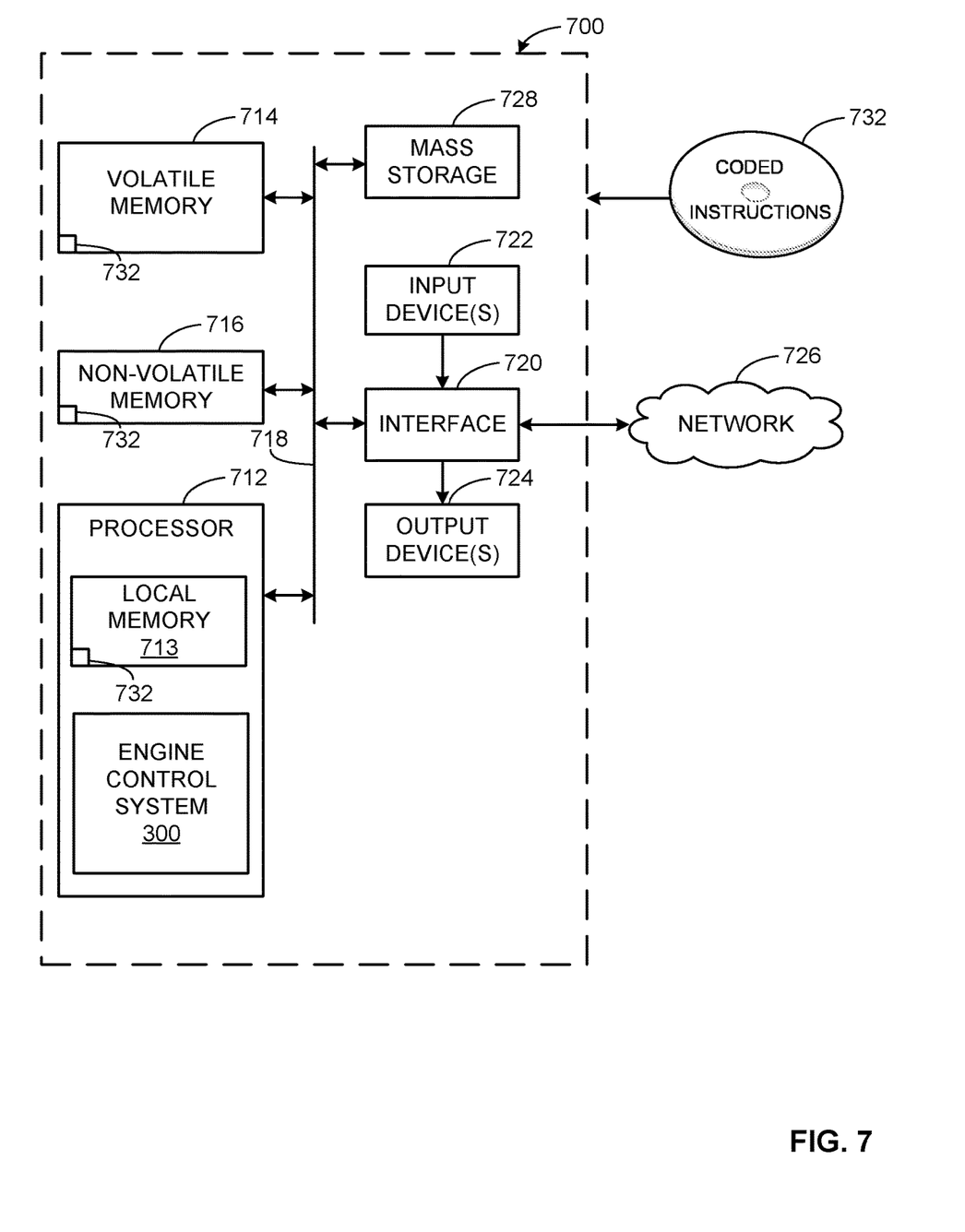
FIG. 7 is a block diagram of an example processor platform structured to executing instructions to implement the example elements disclosed and described herein.

FIG. 7 is a block diagram of an example processor platform 700 structured to executing instructions to implement the example elements disclosed and described herein. The processor platform 700 can be, for example, a server, a personal computer, a mobile device (e.g., a cell phone, a smart phone, a tablet such as an iPad™), a personal digital assistant (PDA), an Internet appliance, or any other type of computing device. The example processor platform 700 can be used to implement the example engine control system 300 and/or 400, for example.

The processor platform 700 of the illustrated example includes a processor 712. The processor 712 of the illustrated example is hardware. For example, the processor 712 can be implemented by integrated circuits, logic circuits, microprocessors or controllers from any desired family or manufacturer.

The processor 712 of the illustrated example includes a local memory 713 (e.g., a cache). The example processor 712 of FIG. 7 executes instructions from the memory 713, etc. The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a clock controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 representing instructions executable by the processor 712 can be stored in the mass storage device 728, in the volatile memory 714, in the non-volatile memory 716, and/or on a removable tangible computer readable storage medium such as a CD or DVD, for example.

From the foregoing, it will be appreciated that the above disclosed methods, apparatus, and articles of manufacture have been disclosed to provide a new, improved electronic engine control system including a direct link between primary and secondary engine controllers. The disclosed methods, apparatus and articles of manufacture provide direct, reliable communication to centralize programming and configuration and eliminate a separate, dedicated manual connection to the engine on the wing of the aircraft and/or other vehicle. The disclosed methods, apparatus and articles of manufacture are accordingly directed to one or more improvement(s) in the functioning of an engine control system. Further, the capabilities of the main engine control processor are expanded to configure itself in a first mode (e.g., a programming mode, etc.) and configure the distributed control processor in a second mode (e.g., a relay mode, etc.).

Certain examples provide a technologically improved electronic engine control system including a processor (e.g., the main processor 322) that operates simultaneously (or substantially simultaneously given processing and/or data access latency, instruction overlap, etc.) as a data loader (e.g., an ARINC 615A data loader) and a loadable device. Certain examples provide for reprogramming of distributed electronic engine control processors from a single aircraft network interface. Certain examples enable determination of which processor to load using the ARINC 665-3 LUH Load Type ID field, for example. Target Hardware ID and Load Type ID fields of a header file can be examined to determine a loadable software part. Collecting load images from the aircraft data loader while waiting for a distributed unit to reboot into load (or programming or install) mode (which can take several minutes) reduces the overall load time. Reprogramming from the aircraft data loader eliminates the need to open an engine cowl and to follow two different procedures for loading electronic engine control software, for example.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

Further aspects of the invention are provided by the subject matter of the following clauses:

1. An electronic engine control system comprising: a first processor programmable by an aircraft data loader according to a file; a second processor programmable by the first processor according to the file; and a wired connection between the first processor and the second processor, the wire connection to transfer the file between the first processor and the second processor.

2. The system of any preceding clause, wherein the first processor is a main processor and the second processor is a distributed processor, wherein the distributed processor is not in communication with the aircraft data loader.

3. The system of any preceding clause, further including the aircraft data loader.

4. The system of any preceding clause, further including an aircraft network interface to transfer the file between the aircraft data loader and the first processor.

5. The system of any preceding clause, wherein the first processor is configured to operate as a loadable device in a first mode and to operate as a data loader in a second mode.

6. The system of any preceding clause, wherein the first processor is configured to operate as both a loadable device and as a data loader while in a programming mode.

7. The system of any preceding clause, further including a maintenance interface for the second processor.

8. The system of any preceding clause, wherein the first processor is to program the second processor while the first processor is being programmed by the aircraft data loader.

9. The system of any preceding clause, wherein the first processor is to trigger a reboot of the second processor to place the second processor in a programming mode to install the file.

10. The system of any preceding clause, further including an engine in which the first processor, the second processor, and the wired connection are arranged.

11. A non-transitory computer readable medium comprising machine-readable instructions that, when executed, cause at least a first processor to at least: receive, from an aircraft data loader, files for installation on the first processor; trigger a reboot of a second processor; and, while installing the files on the first processor, transfer the files to the second processor via a wired connection to facilitate installation of the files on the second processor.

12. The computer readable medium of any preceding clause, wherein the instructions, when executed, configure the first processor to operate as both a loadable device and as a data loader while in a programming mode.

13. The computer readable medium of any preceding clause, wherein the first processor is to program the second processor while the first processor is being programmed by the aircraft data loader.

14. The computer readable medium of any preceding clause, wherein the first processor is to trigger a reboot of the second processor to place the second processor in a programming mode to install the files.

15. The computer readable medium of any preceding clause, wherein the instructions, when executed, are to trigger the first processor to enter a programming mode to receive the files and exit the programming mode after the files are installed.

16. A method for programming an engine control system, the method comprising: receiving, from an aircraft data loader, files for installation on a first processor; triggering a reboot of a second processor; and, while installing the files on the first processor, transferring the files to the second processor via a wired connection to facilitate installation of the files on the second processor.

17. The method of any preceding clause, further including configuring the first processor to operate as both a loadable device and as a data loader while in a programming mode.

18. The method of any preceding clause, wherein the first processor is programming the second processor while the first processor is being programmed by the aircraft data loader.

19. The method of any preceding clause, wherein triggering the reboot of the second processor including placing the second processor in a programming mode to install the files.

20. The method of any preceding clause, further including triggering the first processor to enter a programming mode to receive the files and to exit the programming mode after the files are installed.

21. An apparatus including a first processor programmable by an aircraft data loader according to a file, the first processor to simultaneously program a second processor according to the file by triggering a reboot of the second processor and transmitting the file to the second processor via a wired connection between the first processor and the second processor.

22. An apparatus including: first processing means for programing by an aircraft data loader according to a file; second processing means for programing by the first processor according to the file; and connection means connecting the first processor and the second processor.

The following claims are hereby incorporated into this Detailed Description by this reference, with each claim standing on its own as a separate embodiment of the present disclosure.

What is claimed is:

1. An electronic engine control system comprising:
a first processor positioned at a first location in an aircraft engine under an engine cowl, in communication with an aircraft data loader, and programmable by the aircraft data loader according to a file;
a second processor positioned at a second location apart from the first location in the aircraft engine under the engine cowl and programmable by the first processor according to the file; and
a wired connection between the first processor and the second processor, the wire connection to transfer the file between the first processor and the second processor without opening the engine cowl.

2. The system of claim 1, wherein the first processor is a main processor and the second processor is a distributed processor, wherein the distributed processor is not in communication with the aircraft data loader.

3. The system of claim 1, further including the aircraft data loader.

4. The system of claim 1, further including an aircraft network interface to transfer the file between the aircraft data loader and the first processor.

5. The system of claim 1, wherein the first processor is configured to operate as a loadable device in a first mode and to operate as a data loader in a second mode.

6. The system of claim 1, wherein the first processor is configured to operate as both a loadable device and as a data loader while in a programming mode.

7. The system of claim 1, further including a maintenance interface for the second processor, the maintenance interface accessible through the engine cowl.

8. The system of claim 1, wherein the first processor is to program the second processor while the first processor is being programmed by the aircraft data loader.

9. The system of claim 1, wherein the first processor is to trigger a reboot of the second processor to place the second processor in a programming mode to install the file.

10. The system of claim 1, further including the aircraft engine in which the first processor, the second processor, and the wired connection are arranged.

11. A non-transitory computer readable medium comprising machine-readable instructions that, when executed, cause at least a first processor to at least:
  receive, from an aircraft data loader, files for installation on the first processor, the first processor positioned at a first location in an aircraft engine under an engine cowl;
  trigger a reboot of a second processor positioned at a second location apart from the first location in the aircraft engine under the engine cowl; and
  while installing the files on the first processor, transfer the files to the second processor via a wired connection to facilitate installation of the files on the second processor without opening the engine cowl.

12. The computer readable medium of claim 11, wherein the instructions, when executed, configure the first processor to operate as both a loadable device and as a data loader while in a programming mode.

13. The computer readable medium of claim 11, wherein the first processor is to program the second processor while the first processor is being programmed by the aircraft data loader.

14. The computer readable medium of claim 11, wherein the first processor is to trigger the reboot of the second processor to place the second processor in a programming mode to install the files.

15. The computer readable medium of claim 11, wherein the instructions, when executed, are to trigger the first processor to enter a programming mode to receive the files and exit the programming mode after the files are installed.

16. A method for programming an engine control system, the method comprising:
  receiving, from an aircraft data loader, files for installation on a first processor, the first processor positioned at a first location in an aircraft engine under an engine cowl;
  triggering a reboot of a second processor positioned at a second location apart from the first location in the aircraft engine under the engine cowl; and
  while installing the files on the first processor, transferring the files to the second processor via a wired connection to facilitate installation of the files on the second processor without opening the engine cowl.

17. The method of claim 16, further including configuring the first processor to operate as both a loadable device and as a data loader while in a programming mode.

18. The method of claim 16, wherein the first processor is programming the second processor while the first processor is being programmed by the aircraft data loader.

19. The method of claim 16, wherein triggering the reboot of the second processor includes placing the second processor in a programming mode to install the files.

20. The method of claim 16, further including triggering the first processor to enter a programming mode to receive the files and to exit the programming mode after the files are installed.

21. The systea of claim 5, wherein the first processor is configured to operate as the loadable device to be at least one of programmed or reprogrammed in the first mode, and wherein the first processor is configured to operate as the data loader to at least one of program or reprogram the second processor in the second mode.

* * * * *

UNITED STATES PATENT AND TRADEMARK OFFICE
CERTIFICATE OF CORRECTION

PATENT NO. : 11,956,063 B2
APPLICATION NO. : 17/098955
DATED : April 9, 2024
INVENTOR(S) : King et al.

Page 1 of 1

It is certified that error appears in the above-identified patent and that said Letters Patent is hereby corrected as shown below:

In the Claims

Column 18, Claim 21, Line 30, Delete "systea" and insert --system--.

Signed and Sealed this
Fourth Day of June, 2024

Katherine Kelly Vidal
*Director of the United States Patent and Trademark Office*